(12) United States Patent
Corman et al.

(10) Patent No.: US 7,295,967 B2
(45) Date of Patent: Nov. 13, 2007

(54) SYSTEM AND METHOD OF ANALYZING TEXT USING DYNAMIC CENTERING RESONANCE ANALYSIS

(75) Inventors: Steven R. Corman, Chandler, AZ (US); Kevin J. Dooley, Chandler, AZ (US)

(73) Assignee: Arizona Board of Regents, acting for and on behalf of Arizona State University, Tempe, AZ (US)

( * ) Notice: Subject to any disclaimer, the term of this patent is extended or adjusted under 35 U.S.C. 154(b) by 781 days.

(21) Appl. No.: 10/475,639

(22) PCT Filed: Jun. 3, 2003

(86) PCT No.: PCT/US03/17499

§ 371 (c)(1), (2), (4) Date: Oct. 21, 2003

(87) PCT Pub. No.: WO03/102740

PCT Pub. Date: Dec. 11, 2003

(65) Prior Publication Data

US 2004/0243388 A1  Dec. 2, 2004

Related U.S. Application Data

(60) Provisional application No. 60/385,500, filed on Jun. 3, 2002.

(51) Int. Cl.
*G06F 17/21* (2006.01)
(52) U.S. Cl. ............................................. 704/9; 704/10
(58) Field of Classification Search .................... 704/1, 704/8, 9, 10; 715/531
See application file for complete search history.

(56) References Cited

U.S. PATENT DOCUMENTS

| | | | | |
|---|---|---|---|---|
| 5,696,916 A | * | 12/1997 | Yamazaki et al. | 715/853 |
| 5,721,939 A | * | 2/1998 | Kaplan | 704/9 |
| 6,006,221 A | * | 12/1999 | Liddy et al. | 707/5 |
| 6,169,972 B1 | * | 1/2001 | Kono et al. | 704/257 |
| 6,266,631 B1 | * | 7/2001 | Higginbotham et al. | 704/1 |
| 6,332,118 B1 | * | 12/2001 | Yamabana | 704/9 |
| 6,356,864 B1 | * | 3/2002 | Foltz et al. | 704/1 |
| 6,556,964 B2 | * | 4/2003 | Haug et al. | 704/9 |
| 6,859,771 B2 | * | 2/2005 | Xun et al. | 704/1 |
| 6,961,692 B1 | * | 11/2005 | Polanyi et al. | 704/9 |
| 7,149,695 B1 | * | 12/2006 | Bellegarda | 704/275 |
| 7,152,031 B1 | * | 12/2006 | Jensen et al. | 704/10 |
| 7,165,023 B2 | * | 1/2007 | Corman et al. | 704/9 |

(Continued)

OTHER PUBLICATIONS

International Search Report mailed Nov. 25, 2003 in co-pending international application No. PCT/US03/17499.

(Continued)

*Primary Examiner*—Patrick N. Edouard
*Assistant Examiner*—Douglas C Godbold
(74) *Attorney, Agent, or Firm*—Robert D. Atkins; Quarles & Brady LLP

(57) ABSTRACT

A document analysis tool provides a 3-dimensional network representation of temporal evolution of text in a document. First and second portions of text are extracted from one or more documents. The texts are parsed to identify noun phrases. The noun phrases are stemmed to remove word variations. Words from the first portion of the text are linked together to form a first layer in the network. Words from the second portion of the text are linked together to form a second layer in the network. The second layer exists in a different temporal plane from the first layer. Words that are common between first and second layers are linked together between the first and second layers to provide a visual and analytical representation of relationship between the first and second portions of the text.

21 Claims, 7 Drawing Sheets

U.S. PATENT DOCUMENTS

| | | |
|---|---|---|
| 2002/0002454 A1* | 1/2002 | Bangalore et al. ............. 704/9 |
| 2002/0116170 A1* | 8/2002 | Corman et al. ................ 704/1 |
| 2003/0191627 A1* | 10/2003 | Au ............................... 704/9 |
| 2003/0216905 A1* | 11/2003 | Chelba et al. ................. 704/9 |
| 2005/0154690 A1* | 7/2005 | Nitta et al. ................... 706/46 |

OTHER PUBLICATIONS

Corman et al.;, "Studying Complex Discursive Systems Centering Resonance Analysis of Communication", Human Communication Research, 28(2):157-206, 2002.

* cited by examiner

SYSTEM AND METHOD OF ANALYZING TEXT USING DYNAMIC CENTERING RESONANCE ANALYSIS

CLAIM TO DOMESTIC PRIORITY

The present non-provisional patent application claims priority to provisional application Ser. No. 60/385,500, entitled "Dynamic Centering Resonance Analysis," and filed on Jun. 3, 2002, by Steven R. Corman et al.

RELATED APPLICATIONS

This Application is a U.S. National Stage Application filed under 35 U.S.C. 371 claiming priority from the International Application Ser. No. PCT/US03/17499, filed Jun. 3, 2003, which claims priority from U.S. Provisional Patent Application Ser. No. 60/385,500, filed Jun. 3, 2002, which applications are incorporated herein by reference.

CROSS REFERENCE TO RELATED PATENT APPLICATIONS

The present patent application is related to copending U.S. patent application Ser. No. 10/023,556, entitled "Method for Mining, Mapping, and Managing Organizational Knowledge from Text and Conversation" and filed on Dec. 17, 2001 by Steven R. Corman et al.

FIELD OF THE INVENTION

The present invention relates, in general, to the analysis of text in documents and, more particularly, to system and method of analyzing text using dynamic centering resonance analysis.

BACKGROUND OF THE INVENTION

There exists an astronomical amount of useful and valuable information and knowledge embodied in the text of documents. The documents can exist on numerous media and can take a variety of forms. Documents can take the form of books, articles, academic papers, professional journals, editorial writings, news stories, legal briefs, manuals, and so on. These documents exist as hard paper copies, computer files, and in electronic form on the internet. The documents are typically written in unstructured text, i.e. free-form format of complete grammatical sentences, written in any language, but which are not classified in any systematic way.

The sheer number of documents in the prior art, and corresponding body of knowledge contained therein, make it necessary to use computer-based analysis tools to search, analyze, understand, and make use of the material contained in the documents. With the primary concern being the study of human communications, and how people exchange information and assign meaning to that information, the tools are useful in areas such as searching, knowledge management, competitive intelligence, data mining, data mapping, data management, information retrieval, and intellectual asset management. For example, a number of documents can be stored on a computer system, or a plurality of computer systems interconnected by a communication network such as the internet. With a key word search term or query, a document search tool can examine the documents on the computer system(s) looking for matches or hits to the key word search term. The documents matching the key word search term are identified and retrieved for further study. The search term can include several key words interrelated with Boolean logic to find the relevant documents and retrieve the desired information.

In the prior art, there are other tools that can be used depending on the analysis to be performed on the documents. There may be a need to analyze a group of documents to understand how each relate to the other, with no specific key word or query in mind, or the analysis may involve evaluating how the historical documents change over time. The analysis centers on how the text of one document relates to the text of other document(s).

One prior art document analysis tool uses a vector space model. Vector space analysis involves forming a first vector for a word or group of words in a first document, and a second vector for a word or group of words in a second document, as defined by their index terms. The index terms can be indices such as frequency of occurrence or binary variables. The first and second vectors can be weighted according to the relative importance of the words or groups of words, e.g. with term frequency/inverse document frequency factor (TF/IDF) weighting. A vector correlation is computed as the cosine of the angle between the first and second vectors to determine a distance or proximity between the vectors. Vector space analysis provides a measure of the closeness or importance between two or more documents. In other words, the greater the vector correlation over a large number vector sets in high dimensional space, the more similarities exist between the documents.

Another document analysis tool uses a classification methodology known as clustering. In clustering, words are grouped together or clustered into an inclusion hierarchy based on similar use within the documents. A distance is calculated, e.g. squared Euclidian distance, between clusters in the document. The distance between the clusters provides a measure of the closeness or similarity between the documents. The clustering methodology has a number of well-known variations including agglomerative clustering, divisive clustering, and partitioning of clusters.

Yet another document analysis tool uses a network model that takes into account connections between words. A window model is one type of network model that assumes that the author puts related words in close proximity to one another within the text. The text is preprocessed for stemming, i.e. reducing words to their base or root term by removing prefixes and suffixes, and to remove stop words, i.e. words that are used too frequently to provide any meaningful distinction or discrimination. A moving window of size S words, e.g. S=3 to 5 words, is slid across the text in discrete steps, one or more words at a time. As the window moves across the text, a link is established each time the same word is found in other window(s). The process involves the steps of moving the window, checking for links, moving the window, checking for links, and so on. A network of nodes and links is created to represent the text. The importance or degree of any one node is determined by the number of links coming into that node.

An important limitation with existing document analysis tools is that each fails to take into account the entire structure of the document or the word sense. Most are based on relative distance comparisons, or counts, or weighted counts of words that appear in the text. There is no single way to objectively determine where to cut off a judgment or measure of vector proximity to relevance or closeness between documents. Finally, existing document analysis tools do not model the intent of the author to convey specific, coherent meaning or message. Failure to consider the underlying intent of the document does not take advantage of valuable information embedded within the text.

SUMMARY OF THE INVENTION

The present invention is a method of analyzing temporal changes in text, comprising extracting first and second portions of the text, linking words of the first portion of the text, linking words of the second portion of the text, forming a first layer of a network from the linked words of the first portion of the text, forming a second layer of the network from the linked words of the second portion of the text, wherein the second layer exists in a different temporal plane from the first layer, and linking words common between first and second layers to provide a representation of the relationship between the first and second portions of the text.

DETAILED DESCRIPTION OF THE DRAWINGS

Figure 1:
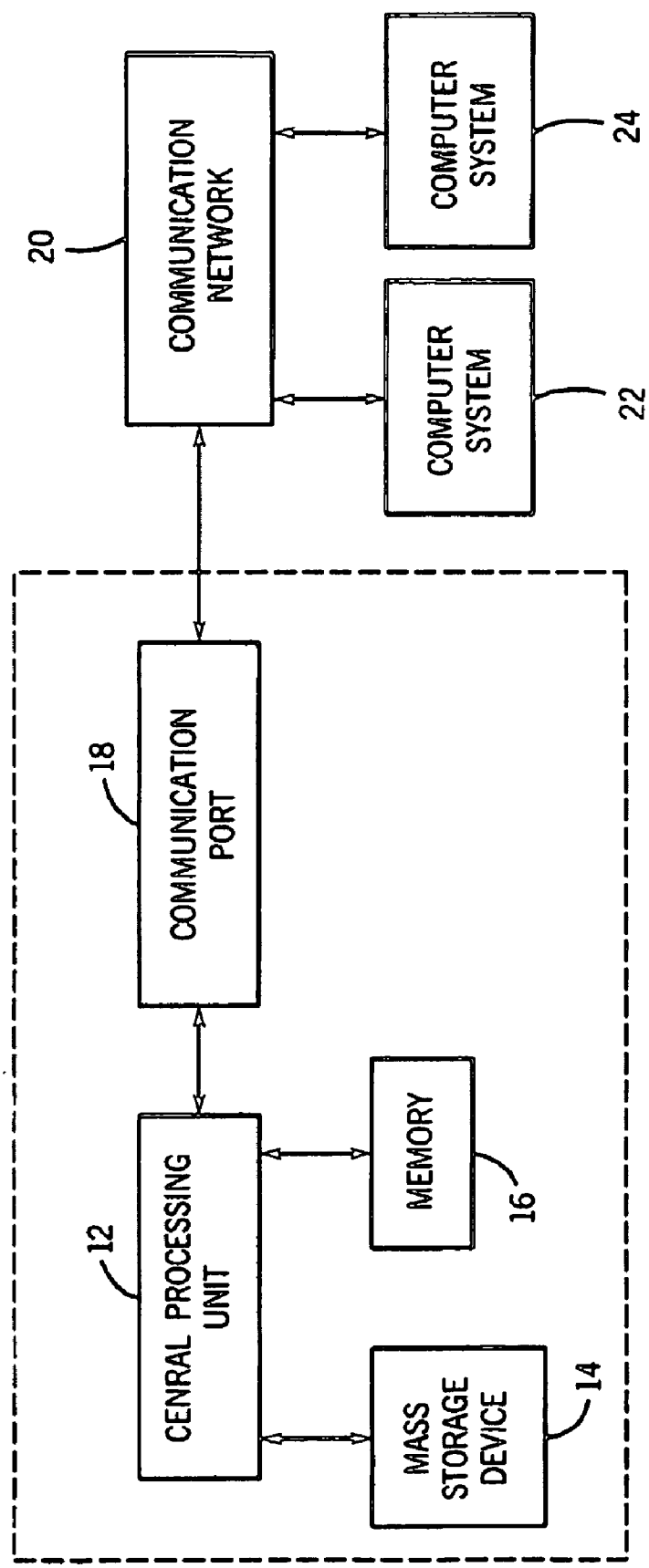
FIG. 1 is a block diagram of an internet-based network computer system.

Referring to FIG. 1, a general purpose computer system 10 is illustrated including a central processing unit or microprocessor 12, mass storage device or hard disk 14, electronic memory 16, and communication port 18. Communication port 18 may be a high speed Ethernet connection to communication network 20. Communication network 20 is an open architecture system such as the world wide web, commonly known as the internet. Computer system 22 and computer system 24 are also connected to communication network 20, which allows communication between computer systems 10, 22, and 24.

Documents exist in a variety of forms on different media. These documents comprise books, articles, academic papers, professional journals, editorial writings, news stories, legal briefs, manuals, etc. and exist as hard paper copies, computer files, and in electronic form on the internet. The documents are typically written in unstructured text, i.e. free-form format of complete grammatical sentences, written in any language, but which are not classified in any systematic way. Computer systems 22 and 24 each contain a number of documents. The documents contain an enormous quantity of useful and valuable information and knowledge.

The present document analysis tool uses a process of dynamic centering resonance analysis (DCRA), which is implemented as a computer program or application software running on general purpose computer system 10 with associated microprocessor, memory, hard disk storage, and communication links such as shown in FIG. 1. The document tool is used to analyze the text contained within one or more documents by creating a 3-dimensional network or model that visually and analytically represents temporal changes or evolution within the text over time. As words, meanings, and ideas within the text are developed from sentence to sentence throughout the document, or from one document to the next document, the relationship between influential or important words evolves and can be used to help find commonality between portions of the same document, or between different documents.

The present document analysis tool can be used to search, analysis, understand, and make use of the vast content of these documents. The document analysis tool is useful to solve industrial problems in areas such as searching, knowledge management, competitive intelligence, data mining, data mapping, data management, information retrieval, and intellectual asset management.

The document analysis process as described herein begins with the preprocessing steps of: (1) performing lexical analysis, (2) extraction of noun phrases from sentences of the text, (3) stemming the nouns and/or adjectives within the noun phrases, (4) removing stop words, and (5) indexing the nouns and/or adjectives within the noun phrases. The nouns and/or adjectives that comprise the noun phrases within each sentence or portion of the document are linked together according to their relative position within the sentence. The linking rules reflect the author's choice to the manner and ways to combine the words.

In a next step, the text in the document is converted to a 3-dimensional, incrementally evolving network. The network can be visualized and analyzed to understand the temporal evolution of the most important ideas or subjects within the document(s). Each material temporal modification becomes a separate layer in the 3-D representation. The stack of layers provides an evolutional time line of the textual content of the document. By visualizing each layer of 3-dimensional network, and the links between layers, the principal commonalities and distinctions of the documents can be identified, studied, and analyzed to understand the relationships between the documents. For example, if one or more noun phrases link through multiple layers of the network, then those noun phrases take on special influence and importance in understanding and classifying the document. If certain noun phrases link between layers found in multiple documents, then these links serve to relate similarities between the documents. Some of the applications for the present document analysis tool include analysis of human conversations, newsgroup archives, software engineering, web graph analysis, social network analysis, discourse networks, and any other collection of recorded words or text that evolve over time.

If the actual changes occurring between consecutive states of an evolving network are an integral part of the data that should be open to analysis, it is insufficient to compute independent layouts and animate between them. To facilitate simultaneous analysis of state and change, the present document analysis tool involves a process where the evolution of the network is unrolled in discrete steps with each step represented as a layer in a 3-dimensional network that can be visualized and analyzed. The process demonstrates a visualization and analysis methodology that displays the nature of change that leads to new states being displayed as new layers in the network.

In a simple example, the evolving network can be two sentences where the words and ideas in a first sentence are further explained and developed in a second sentence. The second sentence may directly follow the first sentence, or may appear in a different portion of the same document, or may be found in a different document. The second sentence occurs chronologically after the first sentence and can be viewed as a temporal evolution of the first sentence with respect to the common words or ideas. A temporal relationship exists between word(s) used in the first sentence and common word(s) used in the second sentence. The ability to visualize and analyze that temporal relationship in a 3-dimensional representation, and use that visualization and analysis to understand and classify the subject text, is a useful and valuable tool for the applications noted above.

Centering Resonance Analysis (CRA) is a method of network text analysis that is designed for the study of temporal evolving systems, e.g. complex discourse systems. Discourse systems are forms of communication involving expression of human thought and encompass a wide range of phenomena, including talk, interpersonal conversations, group discussions, interaction in large organizations, the Internet, and other mass media. The inherent nature of discourse systems involves the text of those systems evolving and changing over time. CRA produces stand-alone, abstract representations of text that can be analyzed alone or arbitrarily combined or compared with other CRA representations. CRA is more fully described in U.S. patent application Ser. No. 10/023,556, which is hereby incorporated by reference.

Let T be text that comprises two or more sentences. Consider an example where T is the following text: "One of the most essential branches of English liberty is the freedom of one's house. A man's house is his castle; and whilst he is quiet, he is well-guarded as a prince in his castle." The text T can come from one document stored on computer system 22, or the two sentences can come from two different documents; one document stored on computer system 22 and one document stored on computer system 24. Computer system 10 accesses the text T from computer system 22 and/or computer system 24.

To begin the preprocessing, the text is converted from its original format, such as HTML, SGML, or XML, to a format, e.g. ASCII or ANSI standards, to be compatible with computer analysis. Next, certain words are extracted from the text. For the present embodiment, noun phrases, which have been found to be particularly distinctive, are identified and extracted from the text. Noun phases are nouns and associated adjectives that modify these nouns found within body of the text. Noun phrases comprise a necessary and integral part of the individual sentences of the text and can be identified using linguistic analysis. Pronouns are not necessarily included as noun phrases because of their limited informational content and relevancy to the analysis. Other distinctive words from the text could be used in the document analysis.

In the present example, the noun phrases are the underlined text: "One of the most essential branches of English liberty is the freedom of one's house. A man's house is his castle; and whilst he is quiet, he is well-guarded as a prince in his castle."

Lexical analysis is then used to convert raw text into a sequence of meaningful tokens suitable for analysis. Lexical analysis involves recognition of word delimiters, detecting tabular material and equations, dealing with numbers, hyphenation, punctuation, and proper names. Lexical analysis can be performed with finite state transducers. Proper names present a special issue where variations in formal names, nicknames, titles, and abbreviations must be reduced to a common base identifier for the person or thing. To solve the proper name problem, rules are written and used to convert variations in proper names to a single form. Other complications arise with the inherent ambiguity in many languages where the same character or word represents different meanings. A period can be the end of a sentence, a decimal point, an abbreviation, or a portion of a uniform resource locator (URL). A dash can be a hyphenation to combine words, a minus sign, or an indicator of numeric ranges. The word "foot" can mean a unit of measure or an extremity of the human body. To handle the ambiguity, rules are written and used to ignore character or words that appear repetitively, or to convert the ambiguities to a single, common meaning or form.

The process of stemming and affix stemming converts words with prefixes and suffixes to their base or root term. Gerunds and plurals, and other endings such as "ing", "es", "tion", "al", and "ly" are stripped away. Any prefix to the word such as "pre", "post", and "non" are also removed. Thus, the word "pre-authorizing" is reduced to "authorize"; and "non-functional" is reduced to "function."

As part of the preprocessing, stop words are removed. Stop words are words that are used too frequency to provide any discriminatory or distinguishing value in the analysis. Other commonly removed words are articles, prepositions, pronouns, conjunctions, and auxiliary/modal verbs.

To complete the preprocessing, word indexing is applied to the text. Word indexing discriminates among words based on their importance and assigns a weight for each word or noun phrase. The TF/IDF weighting function is one technique for word indexing. The standardized term frequency is given as:

$$tf_{i,j} = \frac{freq_{i,j}}{\max_i(freq_{i,j})}$$

where: D is a set of documents
N is the number of texts in some collection
$T_j$ is some document in the collection
$n_i$ is the number of $T_j$ in which the word $k_i$ appears
$freq_{i,j}$ is the number of times word i appears in document $T_j$ The inverse document frequency factor is given as:

$$idf_i = \log_2 \frac{N}{n_i}$$

The TF/IDF weighting term of word $k_i$ is given as:

$$w_{ij} = tf_{ij} \cdot idf_i$$

The TF/IDF term weighting function assigns words importance or influence if they occur relatively frequently in the document, but relative infrequency in the collection of documents. The heaviest TF/IDF weighted words have the highest information value in terms of separating documents in the collection into distinct sets based in word use.

As an example, consider the above two sentences. The TF/IDF weight associated with the word "most" ($\log_2 (2/1)$) is larger than the weight associated with "house" ($\log_2 (2/2)$) because "most" only occurs in one sentence, whereas "house" occurs in both sentences.

Figure 2A:
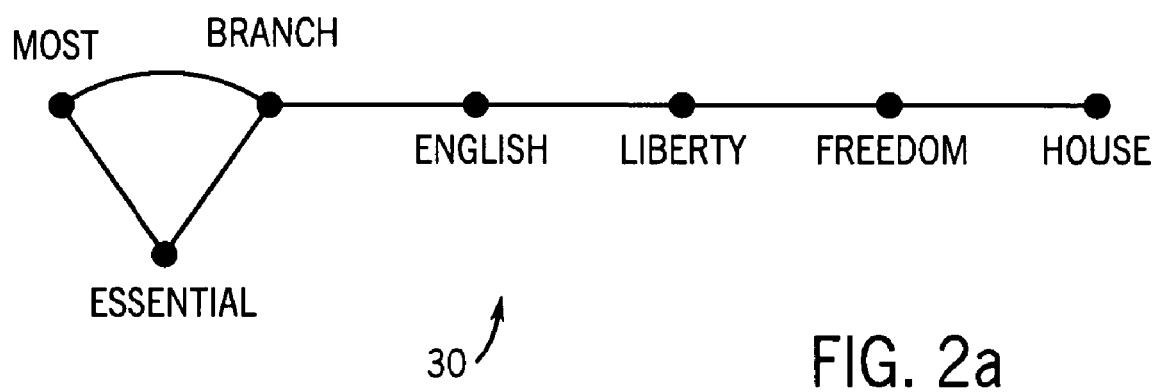
FIGS. 2a and 2b illustrate linking between noun phrases of adjacent sentences.
Figure 2B:
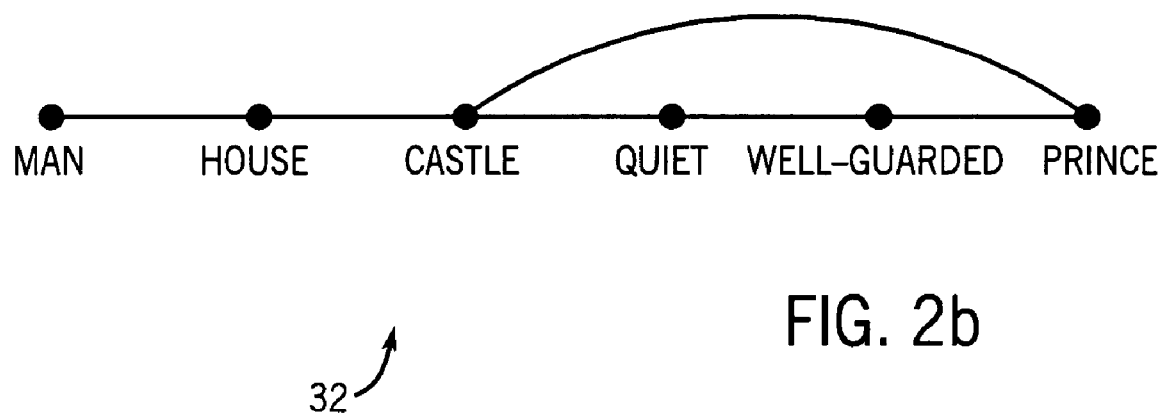

CRA can be used to index words in a network of associations between all relevant words in text T to assess the importance of particular words. The noun phrases from text T are linked together and graphically represented in FIGS. 2a and 2b. Words are considered linked if they co-occur inside noun phrases or occur on adjacent ends of consecutive noun phrases within a sentence. A link is shown between adjacent noun phrases because the author chose to compose one after the other in the sentences and thereby establish a relationship or link. There is a link between "liberty" and "freedom" because they are adjacent noun phrases within the sentence. Likewise, there is a link between "freedom" and "house" because the author choose to compose the noun phrases in sequence. In addition, there are links between "most", "essential", and "branch" because the author intended this group of words to have meaning together. In FIG. 2a, the words are linked by the author's meaning in the first sentence to form a network 30. In FIG. 2b, the words are linked by the author's meaning in the second sentence to form a network 32.

Additional sentences can be converted into a network of linked noun phrases using a similar process. A large document may yield hundreds or even thousands of networks of linked noun phrases. Accumulating the network of each sentence yields a network of words comprised of the subjects and objects of the text and how these are related to one another. The CRA process extracts a graph $G(T)=(V,E)$ from T, where V is a set of nouns and/or adjectives contained in noun phrases, and E is set of edges that denote connections between those nouns and/or adjectives. The graph $G(T)$ shown in FIG. 3 as a 2-dimensional network of text T.

Figure 3:
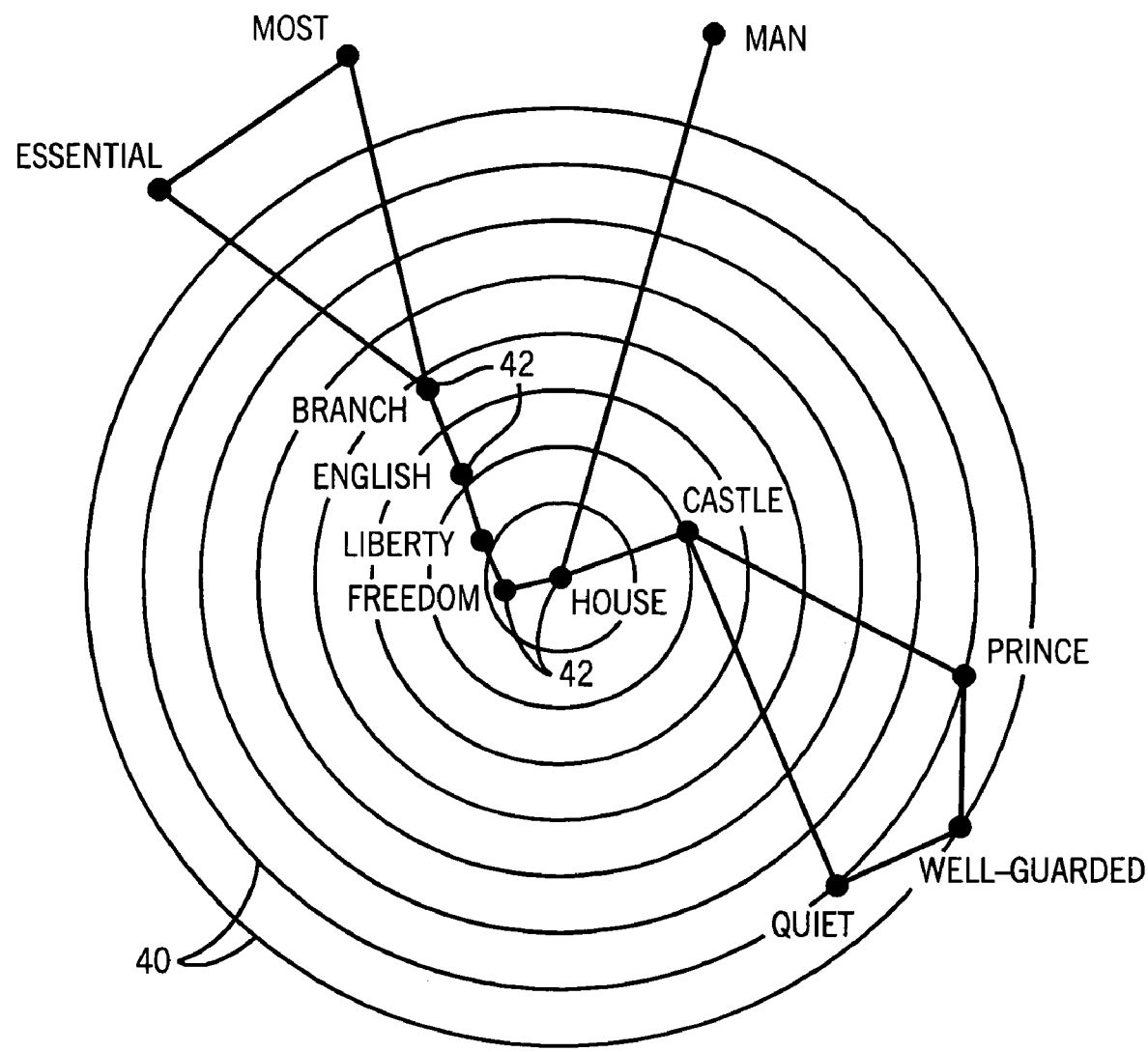
FIG. 3 illustrates a 2-dimensional CRA representation of the noun phrases of FIGS. 2a and 2b.

Competent writers and speakers deploy words strategically to create a sensible, coherent message. Therefore the structural positions of words in the network $G(T)=(V,E)$ reflect their importance or influence in structuring the meanings of the text. While many measures of structural position are possible, CRA uses a particular measure that reflects the extent to which a word is involved in chains of association between other words in the network. The concept of a betweenness centrality, $c_v$, of a vertex $v \in V$ is defined as:

$$\sum_{s \neq v \neq t \in V} \frac{\sigma_G(s, t | v)}{\sigma_G(s, t)}$$

where $\sigma_G(s,t)$ and $\sigma_G(s,t|v)$ are the number of shortest paths between s and t and those that pass through v, respectively. Betweenness centrality is a way to index the words in the text. It looks at all pairs of nodes within the network and finds the shortest paths through the network to such pairs. Given a pair of arbitrary nodes A and B, the importance of node X is determined by the number of shortest paths through the network that node X falls on. Node X becomes important to the meaning flowing through the network if it falls on a number of the shortest paths. Thus, a word having high betweenness centrality is influential or important because it is greatly involved in channeling flows of meaning in the network. The more connected a node within the network, the more important or influential it becomes. In FIG. 3, the concentric circles 40 indicate the levels of centrality. A betweenness centrality is determined for each word in the network. The words with the highest centrality are positioned in the center. The nodes 42 are placed at a distance from the center that reflects their betweenness centrality, with nodes outside the outer circle having centrality equal to zero. Each word of the network is ranked in terms of its importance to the meaning of the network through the betweenness centrality process. On undirected graphs with n vertices and m edges, betweenness centrality is computed in time $O(nm)$.

Although CRA can be applied to a 2-dimensional analysis of static texts, discourse is best thought of as a dynamic process, involving a sequence of speaking turns or a set of time-ordered written texts, e.g. e-mails and press releases. Advances in computer networking such as shown in FIG. 1 have provided unprecedented access to sequences of texts, and advanced voice recognition capability to do the same for spoken communication. The CRA framework can be extended to the analysis of dynamic discourse, i.e. discourse that changes over time. However, changes in text and ideas over time is a primary feature of interest, so analyzing a CRA network of the entire discourse neglects what happens within speaking turns or evolving text and the relationship of words between them and across sets of them.

Dynamic discourse exists at different levels. A single document itself will evolve over time. The end of the document is written at a different, typically later time, than the beginning of the document. As the author develops a topic or idea during the course of the text, the same words will take on new and expanded meaning. The same concept applies to recorded conversation. In another level, an author may have written on a topic in one document and then later the same author, or a different author, could have written another document on the same or related topic. Dynamic discourse provides the ability to analyze multiple documents looking for similarities and differences between documents over time. Thus, DCRA can be applied to one document, or to a number of documents.

The DCRA creates a 3-dimensional network of individual or discrete layers or slices, wherein each layer or slice represents a discrete state of the evolving network. In the present discussion, each layer will constitute one sentence. However, in other examples the layers could constitute other units of text associated with a time period, such as speaking turns in a conversation, news stories in a stream, sections of a book, or issues of a journal.

A discourse episode is defined as a sequence $T=(S_1, \ldots, S_k)$ composed of slices $S_t$ which represent, e.g., a speaking turn or a serial item of written text. Simply deriving a CRA network $G(S_t)$ for each slice would ignore another crucial feature of discourse, namely the fact that humans have conversational memory for more than one speaking turn. A parameter d is therefore used to represent the depth of conversational memory appropriate in a given context. At any given point in time t, $1 < t < k$, the state of the discourse is defined to be $T_t=(S_{t-d'+1}, \ldots, S_t)$ where $d'=\min\{d,t\}$, i.e., the text obtained from concatenating slices in the conversational memory. The importance of words is relative to the conversational memory, and hence calculated in each $G(T_t)$. Thus, importance is dynamic and relative to the changing circumstances of the conversation. The sequence $G(T)=(G(T_1), \ldots, G(T_k))$ constitutes the evolving discourse network.

Evolving networks are characterized by the general gradual changes of the status of a network between consecutive points in time. Standard methods for dynamic graph visualization generate a drawing of each such state, taking into account the drawings of previous states, and animate between consecutive states, thus maintaining the user's mental map and smoothing the transitions from one state to another.

However, the nature of the changes that led to a state cannot be recognized from the state's visualization. Therefore, the present visualization and analysis methodology allows examination of the state of a network and at the same time displays the changes that led to it by unrolling the sequence of events.

Networks that evolve in discrete steps are composed of sub-networks that exist at particular points in time. Since the abstract information inherent to these networks consists of both the structure of sub-networks and changes between them, a layered visualization design is provided in which each newly introduced part of the network is shown in a layer of its own, and the composition of consecutive layers represents the corresponding state of the network. In other words, the dynamics of the network is unrolled into its constituent layers.

In dynamic discourse, each slice induces a modification of the current state through the addition of edges, the potential creation of vertices, and the deletion of edges and vertices that drop out of conversational memory. The layer introduced into our visualization at time t therefore shows only the new elements introduced by the corresponding slice, i.e. $G(S_t)$. By displaying only layers for slices in the current conversational memory, and by making them semi-transparent, a visual representation is obtained that can be viewed from the top to infer the entire state $G(T_i)$ of the conversation, but also shows the contribution of slices $S_{t-d+1}, \ldots, S_t$ with past slices slowly fading away.

Figure 4:
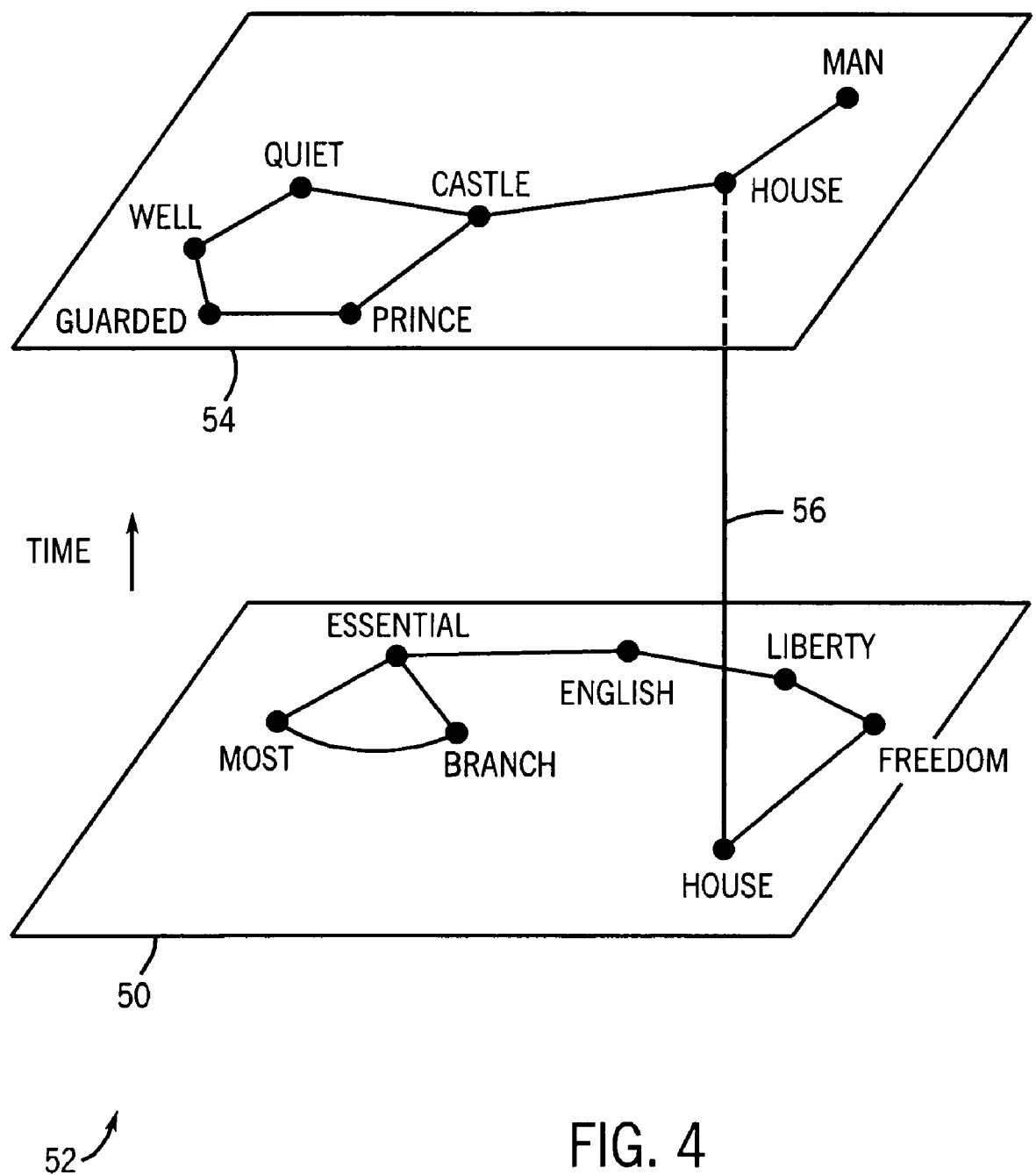
FIG. 4 illustrates a 3-dimensional, 2-layer representation of the noun phrases of FIGS. 2a and 2b.

As a simple illustration, the two sentences defined in text T are preprocessed into the noun phrases with an assigned centrality as described above. The noun phrases of the first sentence of text T are linked together and placed in layer 50 of network 52 as shown in FIG. 4. The noun phrases of the second sentence of text T are linked together and placed in layer 54 of network 52. The first sentence of text T is assumed to be composed at a different time than the second sentence of text T. Thus, layer 50 which corresponds to the first sentence of text T exists on a different temporal plane from layer 54 which corresponds to the second sentence of text T. The element of time is shown in FIG. 4 to be passing or increases in the direction of layer 54. An important feature of DCRA is the recognition that layer 50 and layer 54 have the noun phrase "house" in common. The concept of using the noun phrase "house" existed within the thought process of the author at different points in time to describe the related topics or ideas in the first and second sentences of text T. Moreover, the author's thought process created a meaning or relationship between the first and second sentences of text T and linked that common meaning through the noun phrase "house."

The DCRA process recognizes the information content available through the common noun phrases in different temporal layers of the network. Accordingly, the DCRA process establishes a link 56 between layers of network 52 to connect noun phrases which are common over time. The evolution of the sentences, in combination with their commonality over time, provides considerable insight into the similarities and differences between the sentences of text T. The network can be viewed as a time series of discrete snapshots, which each material and definable state of development or modification placed in a particular layer. In the present example, the first sentence of text T is a first snapshot existing at a first point in time, and the second sentence of text T is a second snapshot existing at a second point in time. Once the layers are defined and populated with linked noun phrases, the commonalities of the noun phrases between temporal layers can be identified and linked together. The result is a visual representation of an evolving network with the common threads clearly shown. The common thread between layers 50 and 54 is the noun phrase "house" which is connected by link 56. In other words, the 3-dimensional DCRA network provides a visual and analytical model of how words change over time in terms of their influence. A common noun phrase may be referenced or linked to a new object that will change or enhance its meaning.

The simplified example of the two sentences of text T can be readily expanded to hundreds or even thousands of sentences and a corresponding large number of layers in the 3-dimensional network. Consider a slightly more involved example with three sentences in text U. The first sentence is: "The military invasion of Iraq with the intent to free its people created a great deal of strategic uncertainty and political wrangling." The second sentence is: "President Bush understood the risk of military action against the Iraqi regime and the political ramifications if the war did not go well." The third sentence is: "Although the rightness or wrongness of the war will be debated for a long time in political halls around the world, one cannot argue that an evil regime has been has been toppled from power with the hope that there are better times ahead for the Iraqi people."

The text U may have all come from one document stored on computer system 22, or the three sentences may have come from multiple documents on different computer systems. The assumption is made that the first sentence of the text U was composed first in time, the second sentence was composed second in time, and the third sentence was composed third in time. Computer system 10 accesses the text U from computer system 22 and/or computer system 24 and begins the preprocessing activity.

The text U is preprocessed as described above to yield the following noun phrases. In the first sentence: "The military invasion of Iraq with the intent to free its people created a great deal of strategic uncertainty and political wrangling." The second sentence is: "President Bush understood the risk of military action against the Iraqi regime and the political ramifications if the war did not go well." The third sentence is: "Although the rightness or wrongness, of the war will be debated for a long time in political halls around the world, one cannot argue that an evil regime has been has been toppled from power with the hope that there are better times ahead for the Iraqi people."

Figure 5:
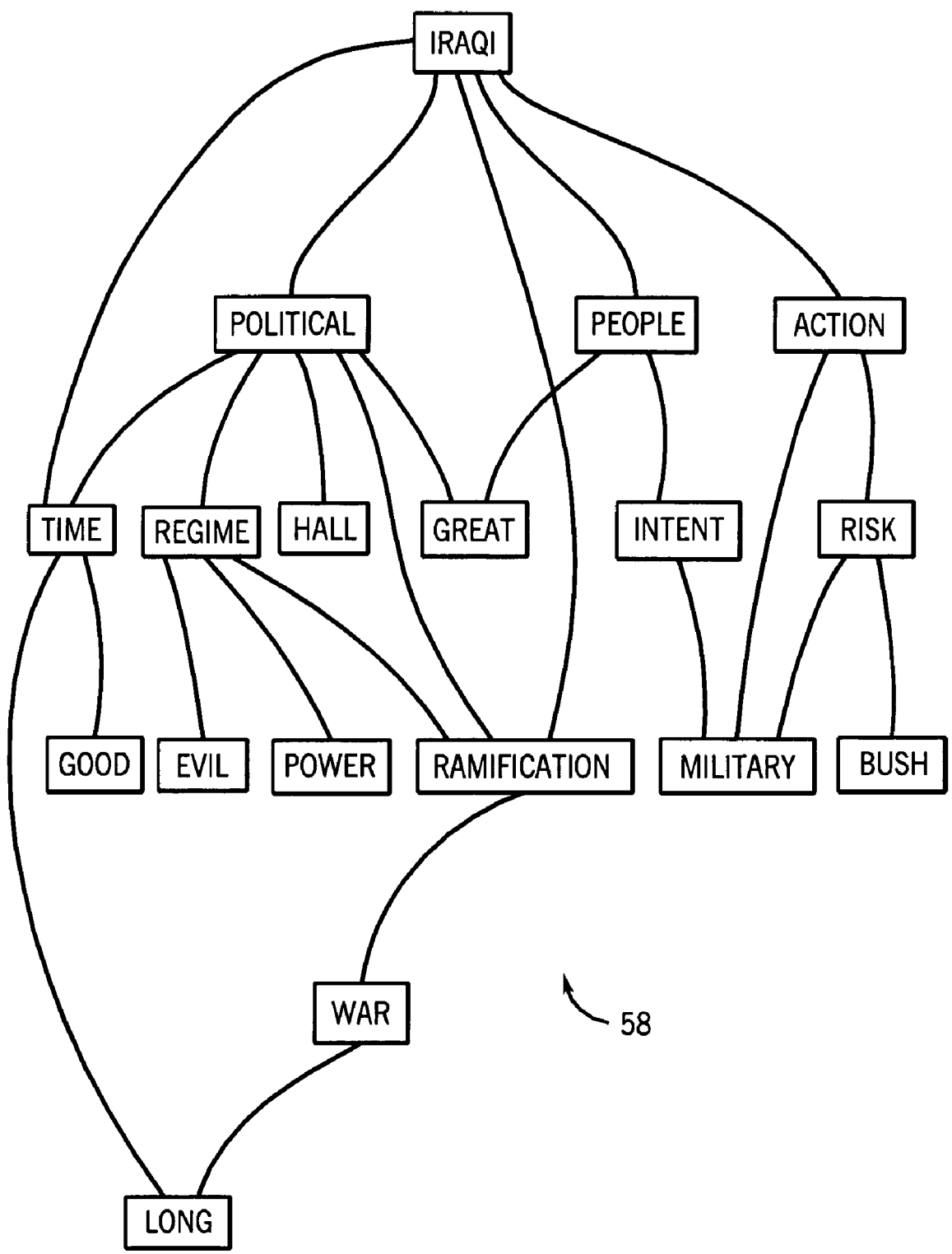
FIG. 5 illustrates a 2-dimensional CRA representation of the noun phrases from three sentences.

FIG. 5 illustrates a two-dimensional CRA network of text U. The words of greater importance and influence, e.g. arises to the top of network 58.

Figure 6:
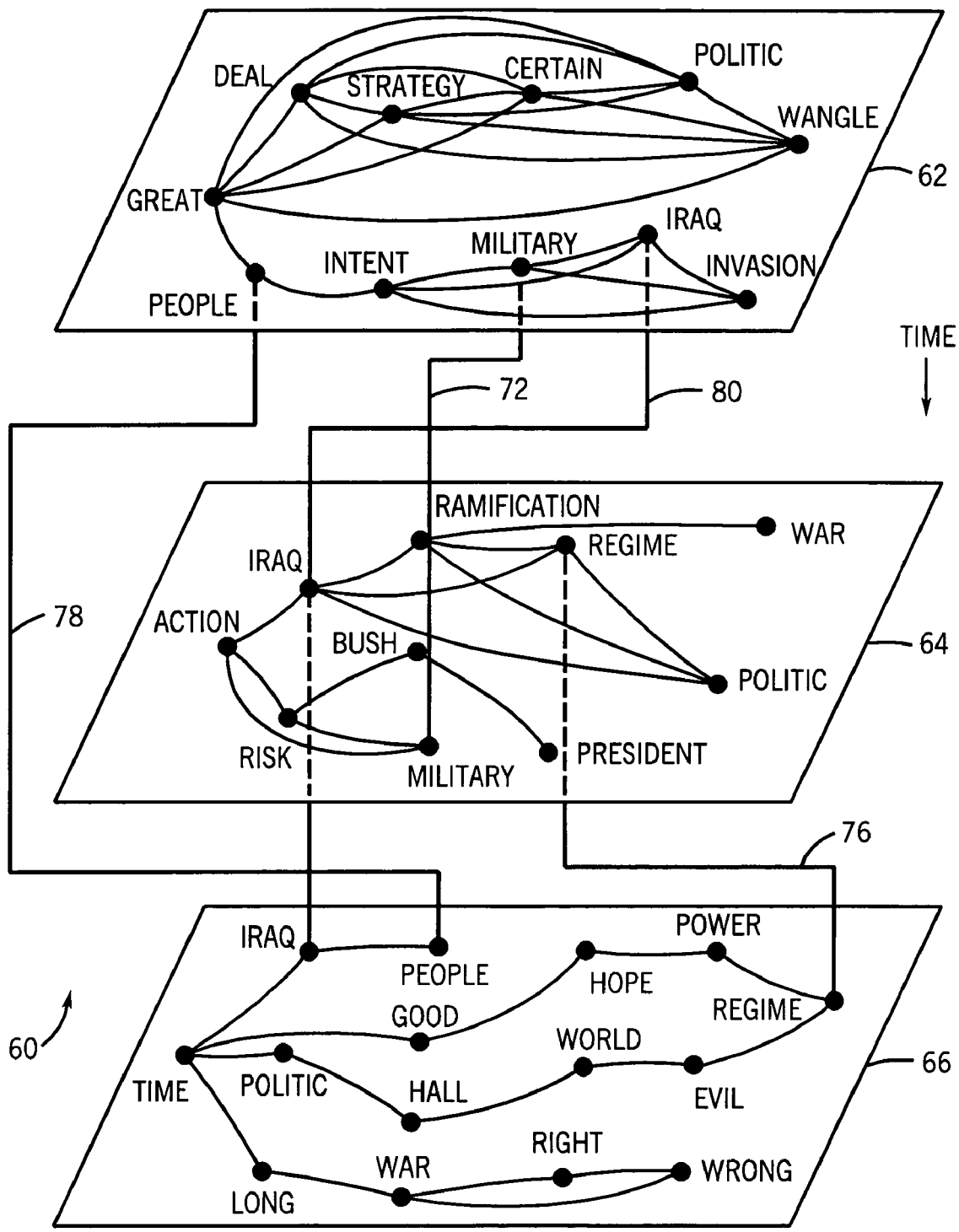
FIG. 6 illustrates a 3-dimensional, 3-layer DCRA representation of the noun phrases from three sentences.

FIG. 6 illustrates a 3-dimensional DCRA network of text U. Each sentence of text U is considered a material and discrete state of the evolving text. Each sentence is parsed into noun phrases which are then linked together in a discrete layer of a network 60 in FIG. 6. The first sentence of text U is shown in layer 62 of network 60 with its noun phrases linked together. The second sentence of text U is shown in layer 64, and the third sentence of text U is shown in layer 66 with its noun phrases linked together. The element of time passes or increases from layer 62 toward layer 66. For each discrete state of the network, i.e. each layer, there exists a relationship of the noun phrases as derived from the author's meaning as indicated by the linkages.

The document analysis tool also recognizes each layer has noun phrases in common with one or more other layers of network 60. Layer 62 and layer 64 have the noun phrase "military" in common. A link 72 is drawn between the noun phrase "military" in layers 62 and 64. In addition, layer 64 and layer 66 have the noun phrases "war" and "regime" in common. A link 76 is drawn between the noun phrase "regime" in layers 64 and 66. In actual practice a link would be drawn between the noun phrase "war" in layers 64 and 66; however, since the linkage is duplicate of the process illustrated by, other links, and in an effort to avoid unduly cluttering FIG. 6, the linkage is omitted from the drawing. Layer 62 and layer 66 have the noun phrase "people" in common. A link 78 is drawn between the noun phrase "people" in layers 62 and 66. Finally, layer 62 and layer 64 and layer 66 all have the noun phrases "politic" and "Iraq" in common. A link 80 is drawn between the noun phrase "politic" in layers 62, 64, and 66. Again, the linkage between noun phrase "Iraq" in layers 62, 64, and 66 is omitted to simplify the drawing.

The DCRA process recognizes the information content available through the common noun phrases in different temporal layers of the network. Accordingly, the DCRA process establishes multiple links between layers 62-66 of network 60 to connect noun phrases which are common over time. The evolution of the sentences, in combination with their commonality over time, provides considerable insight into the similarities and differences between the sentences of text U. The network can be viewed as a time series of discrete snapshots, which each material and definable state placed in a particular layer. In the present example, the first sentence of text U is a first snapshot existing at a first point in time, the second sentence of text U is a second snapshot existing at a second point in time, and the third sentence of text U is a third snapshot existing at a second point in time. Once the layers are defined and populated with linked noun phrases, the commonalities of the noun phrases between temporal layers can be identified and linked together. The result is a visual representation of an evolving network with the common threads clearly shown. There are multiple common threads between layers 62, 64, and 66, including a common thread between all three layer in terms of the noun phrases "politic" and "Iraq." In other words, the 3-dimensional network provides a visualization as how words change over time in terms of their influence.

Figure 7:
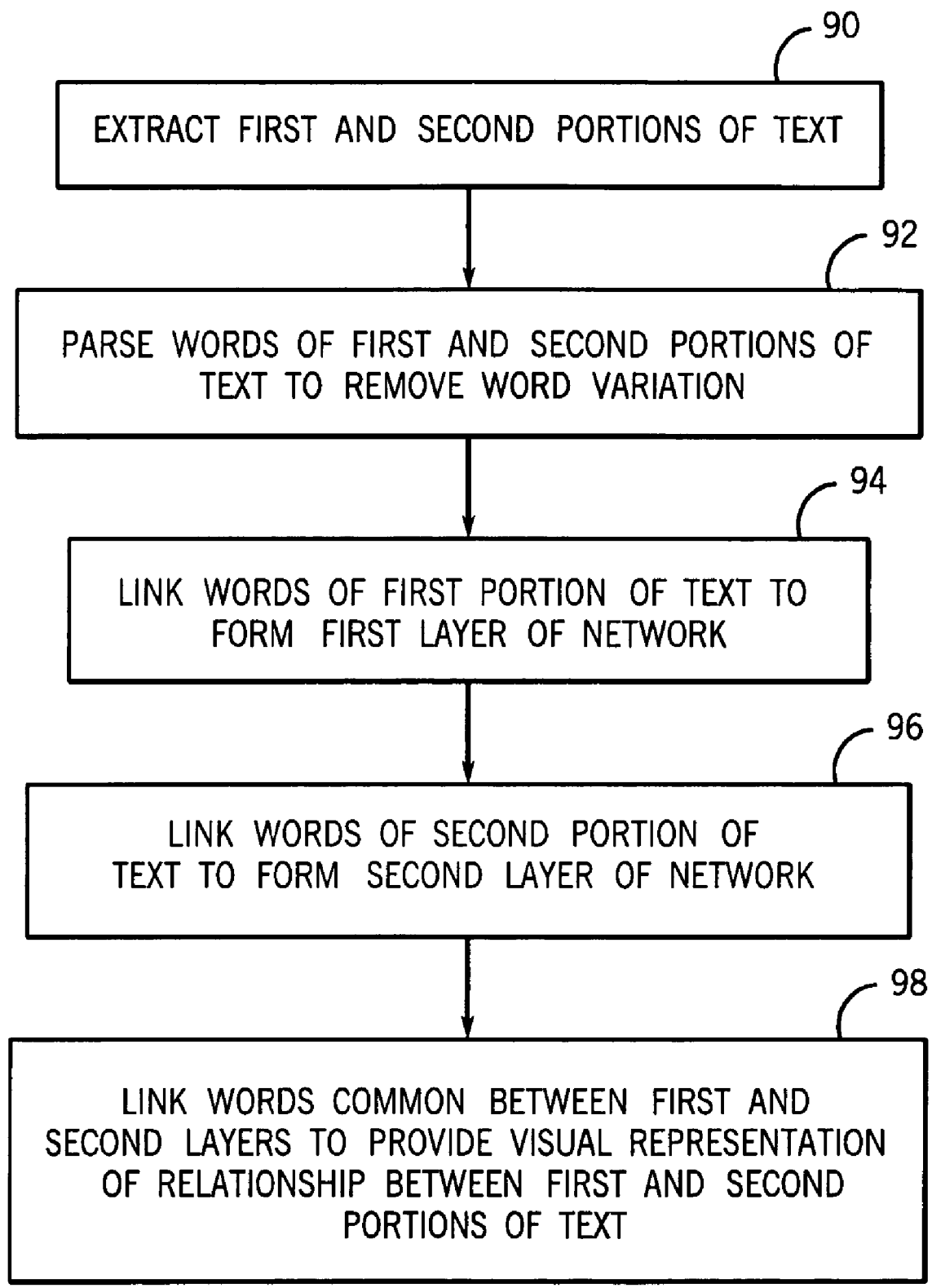
FIG. 7 illustrates the steps involved in the process of forming a 3-dimensional DCRA network.

The steps of forming a 3-dimensional network representation of temporal evolution of text in a document is shown in FIG. 7. Step 90 extracts first and second portions of the text. Step 92 parses the words of the first and second portions of the text to remove word variation. The words of the first and second portions of the text comprise noun phrases. The parsing includes performing lexical analysis on the words of the text, stemming the words of the text, removing stop words from the text, and indexing the words of the text by assigning a weighting function. Step 94 links words of the first portion of the text to form a first layer in the network. Step 96 links the words of the second portion of the text to form a second layer in the network. The second layer exists in a different temporal plane from the first layer. Step 98 links words common between first and second layers to provide a representation of relationship between the first and second portions of the text. A first word from the first layer is connected to the same first word found in the second layer to visually illustrate a point of commonality and provide a basis for analysis between the first and second portions of the text.

Several aspects of a layered visualization can be varied to enrich its information content. In the context of discourse networks, the most interesting additional information are the speakers communicating each in turn, and the changing importance of words.

A distinct color can be assigned to each speaker and border each layer according to whose turn it represents. Edges are colored according to the speaker inducing them. Finally, the color of the speaker is used that introduces a word into the conversational memory for the corresponding vertex.

The current importance of a word is captured by its betweenness centrality in the current state of the conversation. The change in centrality is conveyed by varying the thickness of columns that represent vertices. Let $c_-$ and $c_+$ be the minimum and maximum centrality score over the entire discourse, then the radius of a vertex $\upsilon$ with centrality $c_\upsilon(t)$ at time t is defined as:

$$r_- + \frac{c_\upsilon(t) - c_-}{c_+ - c_-} \cdot (r_+ - r_-)$$

where $r_-$ and $r_+$ denote the minimum and maximum desired thickness of vertices, so that the entire interval is actually used, which results in central words being larger than peripheral words. The changing thickness of a column depicts the centrality profile of a word.

To reduce the complexity of large data sets, an importance threshold can be specified to exclude less important words from the visualization and emphasize the main structure of the discourse.

Any graph layout algorithm can be used to determine the layout of each layer, and in fact the algorithm should be chosen in close accordance with the substantive background of the application generating the graph. In principle, there is no look-ahead in a conversation and the layout of each layer should be contingent on the layout of preceding layers. However, a column-like representation of vertices prevents subsequent adjustments of positions, so that only newly introduced vertices can be placed freely, while all others are fixed at their position in previous layers.

Since this highly constrained, serial layout results in poor readability of later layers, dynamic discourse analysis is not necessarily carried out in real time, so that all slices of a discourse are available from the beginning. A layout of the CRA network G(T) of the entire discourse T=($S_1$, . . . ,$S_k$) is computed, and use its vertex position for the layout of all states G($T_t$), 1<t<k.

As our global layout algorithm a spring embedder variant is chosen that corresponds to metric multidimensional scaling of pair-wise distances, because the results graphically support the intuition of words being close or distant according to the structure of the discourse. The objective is to minimize the squared differences between distances in the layout and distances in the graph, weighted by the square of that distance. For G(T)=(V,E) and vertex positions $(x_\upsilon)_{\upsilon \in V}$ the goal is to minimize:

$$\sum_{u,v \in V} \frac{(\|x_u - x_v\| - d_{G(T)}(u, v))^2}{d_{G(T)}(u, v)^2}$$

where $d_{G(T)}(u,v)$ is the length of a shortest path between u and v in G(T). This is an NP-hard task, so that gradient methods are typically used to obtain a local minimum. A straightforward implementation runs in time $o(n^2)$ per iteration, but typically, little iteration is required.

An extension in which vertices are added incrementally and shown to have empirically better performance. In the present setting, this method is particularly appropriate, because vertices are introduced one slice at a time and thus combine the advantages of global and incremental layout according to the evolution of the graph.

To evaluate the approach for exploratory analysis of evolving networks, a computer-based visualization system is implemented as application software or computer program using Java and the Data Structures Library in Java (JDSL). The implementation produces interactive visualizations through the Extended Application Interface (EAI) for VRML, so that users can move forward and backward in the discourse and rotate, zoom, and pan the scene to view it from any point and orientation.

The following are examples in which the system is used to support DCRA on recorded conversational data. Any other type of incrementally evolving networks, in which states are defined by cross-sections, would be appropriate as well. While the first example is crafted, the other two are extracts of real discourses.

One kind of change in discourse can be described as a gradual movement rather than a wholesale change. An idea expressed at one point in a conversation is linked to an idea at a subsequent point in the conversation, and so on in changing-out fashion. In a DCRA visualization, such a structure appears as a staircase-like configuration, which is defined as a discourse chain. A discourse chain is a subset of words that occur within the discourse network G(T). A chain represents a sequence of words that are semantically connected to one another across multiple CRA networks within G(T).

As an example, assume the following three statements: (1) The dog barked; (2) The old dog had been in the sun; and (3) When the hot sun set, the pooch was happy. The word "dog" occurs in the first and second text and "sun" occurs in the second and third text. Additionally, the network also connects "dog" and "sun" in text 2, and "pooch" and "hot" in text 3. So, a discourse chain is formed between "dog", "sun", and "hot", and "dog", "sun", and "pooch".

A discourse chain formed by first examining all the connections that occur within a time slice (within-connections), and all the connections that occur between time slices due to words co-occurring in two successive slices (between-connections). A chain exists by connecting words that are connected to one another via alternating between- and within-connections. Thus, a discourse chain consists of words connected by first a between-connection, then a within-connection, then a between-connection, then a within-connection, etc. The more coherent is a set of temporal texts, the more chaining that will occur.

In summary, the present document analysis tool implements CRA dynamically, by representing sequences of texts and/or turns in transcribed conversations as independent networks called slices. A stack of these slices represents a period in the sequence that remains within the memory of the analysis. Connections between the nodes across adjacent slices represent cases where words have been re-used from slice to slice, and indicate important features of movement and coordination in the discourse. The slices in a given stack can also be collapsed to yield a CRA network representing the entire interval. This can be used in resonance-based operations to model and search conversations and/or sequences of texts. Possible commercial applications exist in video/audiotape, indexing/search/retrieval, "knowledge capture," group decision support systems, diagnosis of disorders reflected in speech patterns, and communication skill assessment.

The present invention has been described with respect to preferred embodiment(s). Any person skilled in the art will recognize that changes can be made in form and detail, and equivalents may be substituted for elements of the invention without departing from the spirit and scope of the invention. Therefore, it is intended that the invention not be limited to the particular embodiments disclosed for carrying out this invention, but that the invention will include all embodiments falling within the scope of the following claims.

What is claimed is:

1. A computer-implemented method of analyzing temporal changes in text over a plurality of documents, comprising:
    extracting a first portion of the text from a first document;
    extracting a second portion of text from a second document created at a different point in time from the first document;
    performing lexical analysis to convert the first and second portions of text into tokens suitable for analysis, including recognition and removal of word delimiters, tabular material and equations, numbers, hyphens, punctuation, and proper names;
    assigning a weight of importance for each word in the first and second portions of text based on frequency of use;
    stemming the first and second portions of the text to convert each word of the text to a base term;
    removing frequently used words from the first and second portions of the text;
    linking words of the first portion of the text having an influence in understanding and classifying the text;
    linking words of the second portion of the text having an influence in understanding and classifying the text;
    forming a first layer of a network from the linked words of the first portion of the text;
    forming a second layer of the network from the linked words of the second portion of the text, wherein the second layer exists in a different temporal plane from the first layer due to differences between the first and second portions of text resulting from changes made to the first or second documents over time;
    linking words common between first and second layers to provide a three-dimensional model as to how the first and second portions of the text change over time in terms of their similarities and differences and relative influence; and
    displaying the three-dimensional model of the first and second portions of the text.

2. The method of claim 1, wherein the words of the first and second portions of the text comprise noun phrases.

3. The method of claim 1, wherein the step of linking words common between first and second layers include connecting a first word from the first layer to the same first word found in the second layer to analyze a point of commonality between the first and second portions of the text.

4. The method of claim 2, further including the step of forming a discourse chain between words that occur in the first and second layers with words that occur in a third layer.

5. The method of claim 1 wherein the text comprises recorded speech.

6. A computer-implemented method of analyzing a plurality of documents, comprising:
    extracting a first portion of text from a first document;
    extracting a second portion of text from a second document created at a different point in time from the first document;
    linking words of the first portion of the text having an influence in understanding and classifying the text;
    linking words of the second portion of the text having an influence in understanding and classifying the text;
    forming a first layer of a network from the linked words of the first portion of the text;
    forming a second layer of the network from the linked words of the second portion of the text, wherein the second layer exists in a different temporal plane from the first layer due to differences arising between the first and second documents over time;

linking words common between first and second layers to provide a three-dimensional model as to how the first and second portions of the text compare in terms of their similarities and differences and relative influence over time; and displaying the three-dimensional model of the first and second portions of the text.

7. The method of claim 6, wherein the words of the first portion of the text include noun phrases.

8. The method of claim 6, further including parsing the words of the first portion of the text.

9. The method of claim 8, wherein the step of parsing the words of the first portion of the text includes:

performing lexical analysis on the words of the first portion of the text;

stemming the words of the first portion of the text;

removing stop words from the first portion of the text; and indexing the words of the first portion of the text by assigning a weighting function.

10. The method of claim 9, wherein the step of indexing the words of the first portion of the text includes computing a centrality for the words of the first portion of the text.

11. The method of claim 6, wherein the step of linking words common words between first and second layers includes connecting a first word from the first layer to the same first word found in the second layer to analyze a point of commonality between the first and second portions of the text.

12. The method of claim 6, further including the step of forming a discourse chain between words that occur in the first and second layers with words that occur in a third layer.

13. A computer readable storage medium containing computer readable program code usable with a programmable computer processor, comprising:

computer readable program code which extract a first portion of text from a first document;

computer readable program code which extract a second portion of text from a second document created at a different point in time from the first document;

computer readable program code which link words of the first portion of the text having an influence in understanding and classifying the text;

computer readable program code which link words of the second portion of the text having an influence in understanding and classifying the text;

computer readable program code which form a first layer of a network from the linked words of the first portion of the text;

computer readable program code which form a second layer of the network from the linked words of the second portion of the text, wherein the second layer exists in a different temporal plane from the first layer due to differences arising between the first and second documents over time;

computer readable program code which link words common between first and second layers to provide a three-dimensional model as to how the first and second portions of the text compare in terms of their similarities and differences and relative influence over time; and computer readable program code which display the three-dimensional model of the first and second portions of the text.

14. The computer readable storage medium of claim 13, wherein the words of the first portion of the text include noun phrases.

15. The computer readable storage medium of claim 13, further including:

computer program product which performs lexical analysis on the words of the first portion of the text;

computer program product which stems the words of the first portion of the text;

computer program product which removes stop words from the first portion of the text; and computer program product which indexes the words of the first portion of the text by assigning a weighting function.

16. The computer readable storage medium of claim 13, further including computer program product which computes a centrality for the words of the first portion of the text.

17. A computer system for providing a 3-dimensional network representation of temporal evolution of text in a document, comprising:

means for extracting first and second portions of the text;

means for extracting a first portion of text from a first document;

means for extracting a second portion of text from a second document created at a different point in time from the first document;

means for linking words of the first portion of the text having an influence in understanding and classifying the text;

means for linking words of the second portion of the text having an influence in understanding and classifying the text;

means for forming a first layer of a network from the linked words of the first portion of the text;

means for forming a second layer of the network from the linked words of the second portion of the text, wherein the second layer exists in a different temporal plane from the first layer due to differences arising between the first and second documents over time;

means for linking words common between first and second layers to provide a three-dimensional model as to how the first and second portions of the text compare in terms of their similarities and differences and relative influence over time; and means for displaying the three-dimensional model of the first and second portions of the text.

18. The computer system of claim 17, wherein the words of the first portion of the text include noun phrases.

19. The computer system of claim 17, further including means for parsing the words of the first portion of the text.

20. The computer system of claim 19, wherein the means of parsing the words of the first portion of the text includes:

means for performing lexical analysis on the words of the first portion of the text;

means for stemming the words of the first portion of the text;

means for removing stop words from the first portion of the text; and means for indexing the words of the first portion of the text by assigning a weighting function.

21. The computer system of claim 20, wherein the means of indexing the words of the first portion of the text includes means for computing a centrality for the words of the first portion of the text.

* * * * *